United States Patent
Lim et al.

(10) Patent No.: US 12,174,621 B2
(45) Date of Patent: Dec. 24, 2024

(54) QUANTITATIVE DIAGNOSTIC METHOD FOR QUALITY OF MANUFACTURING EQUIPMENT

(71) Applicant: LG ENERGY SOLUTION, LTD., Seoul (KR)

(72) Inventors: Seung Hyun Lim, Daejeon (KR); Ki Eun Sung, Daejeon (KR); Dong Hee Sul, Daejeon (KR); Hyun Tae Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 434 days.

(21) Appl. No.: 17/612,434

(22) PCT Filed: Aug. 3, 2020

(86) PCT No.: PCT/KR2020/010190
§ 371 (c)(1),
(2) Date: Nov. 18, 2021

(87) PCT Pub. No.: WO2021/029583
PCT Pub. Date: Feb. 18, 2021

(65) Prior Publication Data
US 2022/0244714 A1 Aug. 4, 2022

(30) Foreign Application Priority Data

Aug. 9, 2019 (KR) .................. 10-2019-0097050

(51) Int. Cl.
*G05B 19/418* (2006.01)
*G06F 17/14* (2006.01)

(52) U.S. Cl.
CPC ... *G05B 19/41875* (2013.01); *G05B 19/4183* (2013.01); *G06F 17/142* (2013.01)

(58) Field of Classification Search
CPC .......... G05B 19/41875; G05B 19/4183; G06F 17/142; G06F 17/10; G06Q 10/06395;
(Continued)

(56) References Cited

U.S. PATENT DOCUMENTS

| | | |
|---|---|---|
| 5,815,397 A | 9/1998 | Saito et al. |
| 6,550,220 B1 | 4/2003 | Focke et al. |

(Continued)

FOREIGN PATENT DOCUMENTS

| | | |
|---|---|---|
| CN | 1289706 A | 4/2001 |
| CN | 1502424 A | 6/2004 |

(Continued)

OTHER PUBLICATIONS

Office Action issued in corresponding Indian Patent Application No. 202117053930 dated Jul. 21, 2022 .

(Continued)

*Primary Examiner* — Rami R Okasha
(74) *Attorney, Agent, or Firm* — MORGAN, LEWIS & BOCKIUS LLP

(57) ABSTRACT

The present invention relates to a method for quantifying and diagnosing the quality of manufacturing equipment, that is, to a quantitative diagnostic method for the quality of manufacturing equipment. It is possible to quantify the quality of manufacturing equipment having a plurality of production elements and diagnose same in a single attempt.

10 Claims, 4 Drawing Sheets

(58) Field of Classification Search
CPC .. G06Q 50/04; H01M 10/0525; H01M 10/48; H01M 10/488; G01H 13/00; G01H 17/00; Y02E 60/10; Y02P 90/30; G01R 31/3865; G01N 29/045; G01N 29/048
See application file for complete search history.

(56) References Cited

U.S. PATENT DOCUMENTS

| | | |
|---|---|---|
| 2004/0153196 A1 | 8/2004 | Park et al. |
| 2005/0288881 A1 | 12/2005 | Hori |
| 2012/0259569 A1* | 10/2012 | Miwa ............... H01M 10/441 702/63 |
| 2014/0022093 A1* | 1/2014 | Hubauer ........... G05B 19/4183 340/870.02 |
| 2017/0076919 A1 | 3/2017 | Fujii et al. |
| 2019/0011383 A1 | 1/2019 | Cohen et al. |
| 2020/0159183 A1 | 5/2020 | Ueda |
| 2020/0256766 A1* | 8/2020 | Li ........................ G01H 1/003 |
| 2021/0247365 A1* | 8/2021 | Jauriqui ............... G01N 29/46 |

FOREIGN PATENT DOCUMENTS

| | | |
|---|---|---|
| CN | 107194826 A | 9/2017 |
| DE | 10-2016-012451 A1 | 1/2018 |
| IN | 103606012 A | 2/2014 |
| JP | H08-118443 A | 5/1996 |
| JP | H09-171008 A | 6/1997 |
| JP | H10-209230 A | 8/1998 |
| JP | 2001-25819 A | 1/2001 |
| JP | 2001-151205 A | 6/2001 |
| JP | 2002-297217 A | 10/2002 |
| JP | 2005-195422 A | 7/2005 |
| JP | 2006-113002 A | 4/2006 |
| JP | 2006-234785 A | 9/2006 |
| JP | 2009-300401 A | 12/2009 |
| JP | 2011-237459 A | 11/2011 |
| JP | 2013-61291 A | 4/2013 |
| JP | 2013-114362 A | 6/2013 |
| JP | 5218614 B2 | 6/2013 |
| JP | 2013-222259 A | 10/2013 |
| JP | 2015-215183 A | 12/2015 |
| JP | 2017-119285 A | 7/2017 |
| JP | 2018-115874 A | 7/2018 |
| JP | 2019-87101 A | 6/2019 |
| KR | 10-1159233 B1 | 6/2012 |
| KR | 10-1329996 B1 | 11/2013 |
| KR | 10-2014-0075983 A | 6/2014 |
| KR | 10-2016-0082716 A | 7/2016 |
| KR | 10-2016-0085030 A | 7/2016 |
| KR | 10-2018-0063927 A | 6/2018 |
| KR | 10-2019-0000826 A | 1/2019 |
| KR | 10-1966270 B1 | 4/2019 |
| KR | 10-2040179 B1 | 11/2019 |
| WO | 2018/096682 A1 | 5/2018 |
| WO | 2019/016892 A1 | 1/2019 |

OTHER PUBLICATIONS

Office Action dated Aug. 30, 2023 issued in corresponding Chinese Patent Application No. 202080039745.2.
Extended European Search Report dated Jun. 9, 2022 issued by the European Patent Office in corresponding European Patent Application No. 20851856.3.
Schnell et al., "Quality Management for Battery Production: A Quality Gate Concept," Procedia CIRP, vol. 57, pp. 568-573 (2016).
Kurfer et al., "Production of large-area lithium-ion cells—Preconditioning, cell stacking and quality assurance," CIRP Annals, vol. 61, pp. 1-4 (2012).
Zappen et al., "Application of Time-Resolved Multi-Sine Impedance Spectroscopy for Lithium-Ion Battery Characterization," Batteries, vol. 4, No. 4, p. 64 (2018).
International Search Report (with partial translation) and Written Opinion dated Oct. 27, 2020 issued in corresponding International Patent Application No. PCT/KR2020/010190.
Office Action dated Jul. 25, 2024 issued in Korean Patent Application No. 10-2019-0097050.
Office Action dated Mar. 23, 2024 issued in corresponding Chinese Patent Application No. 202080039745.2.

* cited by examiner

[FIG. 1]
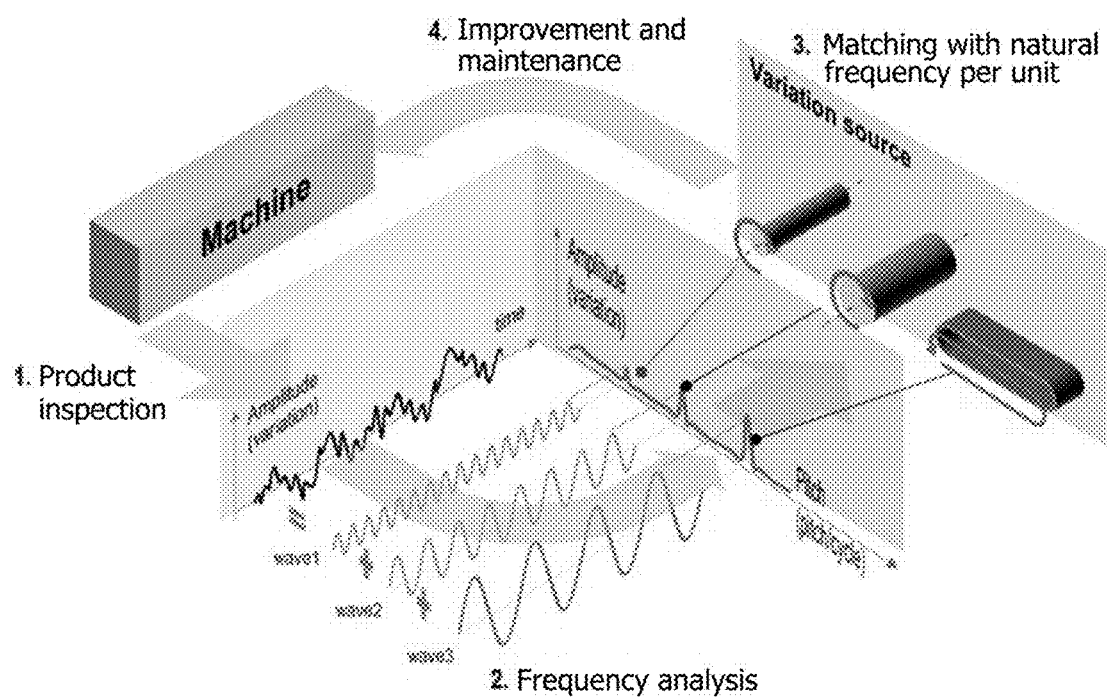

[FIG. 2]
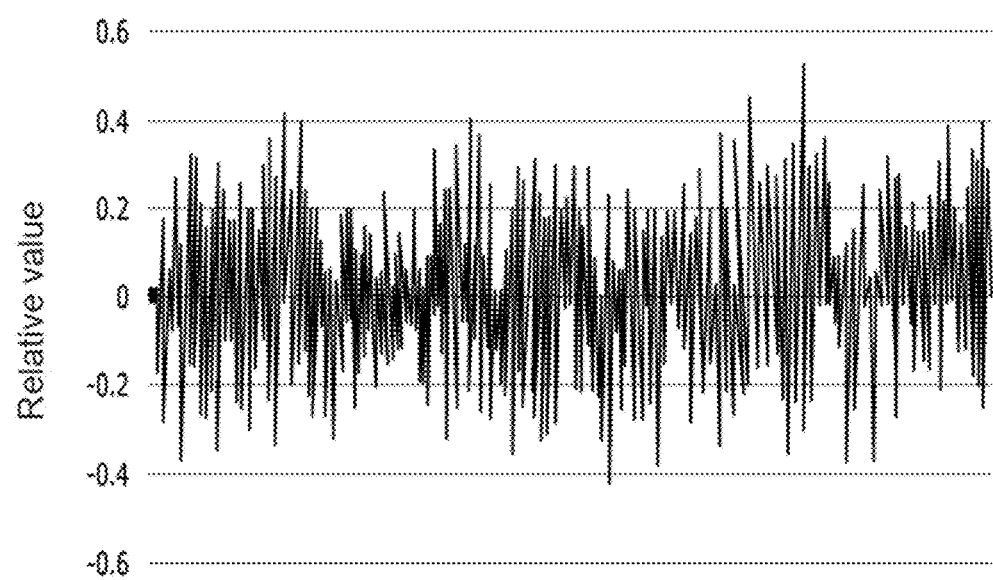

[FIG. 3]
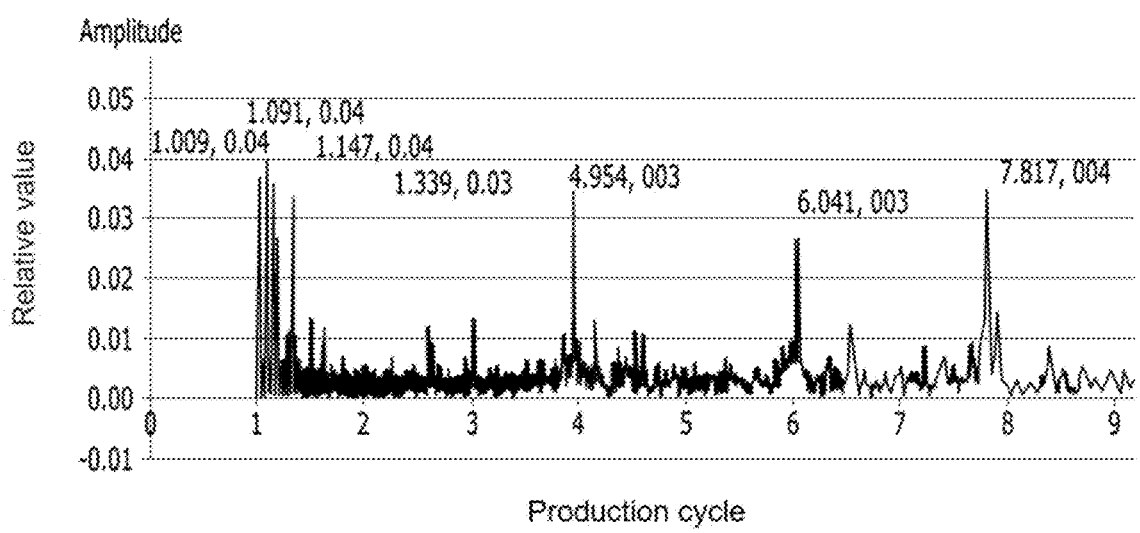

[FIG. 4]
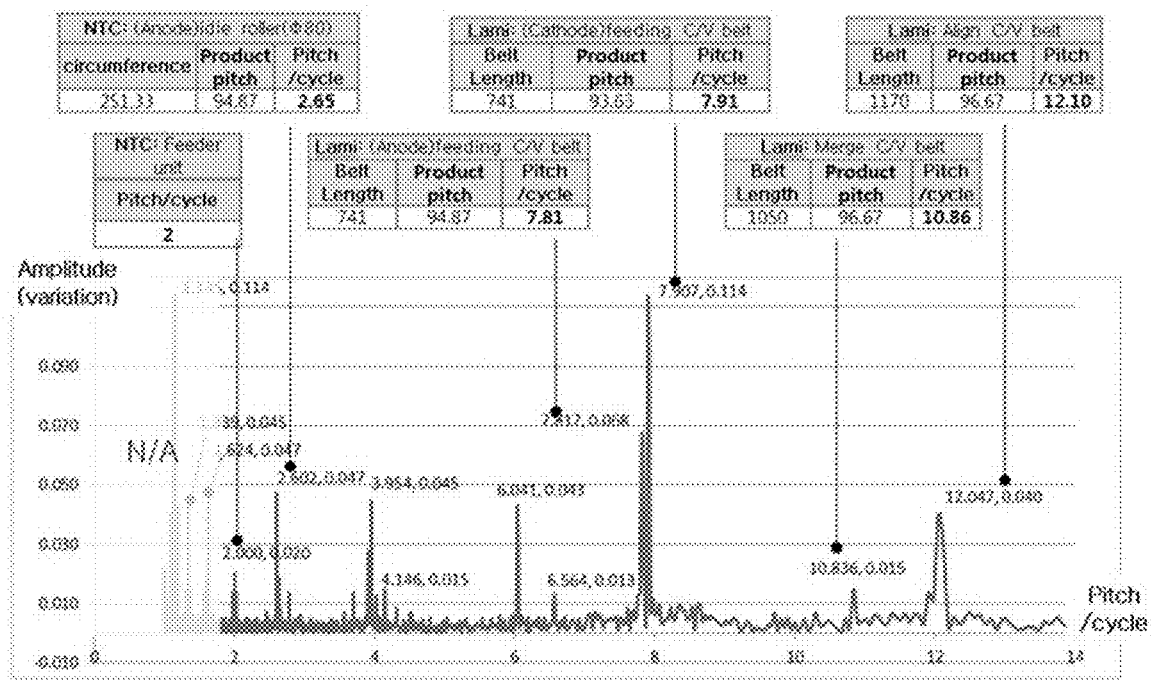

QUANTITATIVE DIAGNOSTIC METHOD FOR QUALITY OF MANUFACTURING EQUIPMENT

TECHNICAL FIELD

The present invention relates to a method of quantifying and diagnosing the quality of a manufacturing facility.

This application claims the benefit of priority based on Korean Patent Application No. 10-2019-0097050, filed on Aug. 9, 2019, and the entire contents of the Korean patent application are incorporated herein by reference.

BACKGROUND ART

Recently, secondary batteries capable of charging and discharging have been widely used as energy sources of wireless mobile devices. In addition, the secondary battery has attracted attention as a power source of an electric vehicle (EV), a hybrid electric vehicle (HEV), etc., which are proposed as a solution for air pollution of existing gasoline vehicles and diesel vehicles using fossil fuel.

Therefore, the types of applications using the secondary battery are currently much diversified due to the advantages of the secondary battery, and it is expected that the secondary battery will be applied to many fields and products in the future.

In small mobile devices, one or a small number of battery cells are used per device, whereas in medium-large-sized devices such as automobiles, due to the necessity of high power and large capacity, a medium-to-large battery module electrically connected to a plurality of battery cells is used.

On the other hand, if the defect rate increases as a result of quality inspection for the manufactured secondary battery, diagnosis and supplementation of the above manufacturing facilities are required. However, equipment for manufacturing secondary batteries includes various production factors. Therefore, in order to identify the production factors that cause product defects, an overall diagnosis of the entire manufacturing facility is required. This causes a decrease in process efficiency for the secondary battery.

DISCLOSURE

Technical Problem

It is an object of the present invention to solve the above-mentioned problems of the prior art and the technical problems required from the past. It is an object of the present invention to a method for quantifying and diagnosing the quality of a manufacturing facility having a plurality of production factors.

Technical Solution

In order to achieve the above object, a method for diagnosing a quality of a manufacturing facility according to the present invention includes:

a step of obtaining continuous inspection values for a target product;

a step of deriving a conversion peak per frequency indicating a degree of expression per production cycle by separating the continuously obtained inspection values for each frequency band;

a step of securing the natural frequency for each production factor expressed per production cycle for each production factor; and a step of diagnosing the quality of each production factor by comparing the natural frequency of each production factor and the conversion peak per frequency.

In one example, in the method for diagnosing a quality of a manufacturing facility according to the present invention, the step of obtaining the continuous inspection values for the target product includes inspecting a specific factor of the target product and continuously acquiring the inspection values by comparing inspection results based on a reference value.

Specifically, the step of obtaining the continuous inspection values for the target product includes inspecting a specific factor of the target product, wherein if an inspection result exceeds a reference value, the specific factor is quantified as a positive number, and wherein if the inspection result is less than the reference value, the specific factor is quantified as a negative number, and continually obtaining quantified numbers.

For example, in the step of acquiring continuous inspection values for the target product, the target product is an electrochemical device. In the present invention, the electrochemical device includes not only a unit cell such as a battery or a capacitor, but also a battery module or a battery pack. Specifically, the electrochemical device is a secondary battery, for example, a lithium secondary battery.

In one example of the present invention, the step of deriving the conversion peak per frequency indicating the degree of expression per production cycle by separating the continuously obtained inspection values for each frequency band is performed by Fast Fourier Transform (FFT).

In one example, the step of securing the natural frequency for each production factor expressed per production cycle for each production factor includes deriving production factors that affect production of the target product, and securing a natural frequency based on the number of expressions per production cycle for each derived production factor.

Specifically, the number of expressions per production cycle for each production factor is a result of extracting a frequency at which an inspection value for a specific factor of the target product deviates from a standard value due to an influence of each production factor.

Further, the production factor is an equipment factor involved in the production of the target product. For example, the equipment factor is an electrochemical device manufacturing equipment factor.

In one example, the step of diagnosing the quality of each production factor by comparing the natural frequency of each production factor and the conversion peak per frequency includes selecting a production factor of a natural frequency corresponding to a frequency at which the conversion peak is high is selected as a subject of quality improvement by comparing each conversion peak per frequency for each natural frequency for each pre-set production factor.

In another example, by comparing each conversion peak per frequency for each natural frequency for each pre-set production factor, a production factor of a natural frequency corresponding to a frequency at which a conversion peak is higher than a specific value is selected as a subject of quality improvement, and a production factor of a natural frequency corresponding to a frequency at which the conversion peak is lower than a specific value is excluded from the subject of quality improvement.

In another example, after the step of diagnosing the quality of each production factor by comparing the natural frequency of each production factor and the conversion peak per frequency, the method further includes a step of supplementing or replacing production factors selected as subjects of quality improvement.

Advantageous Effects

The method of quantifying and diagnosing the quality of a manufacturing facility according to the present invention can quantify the quality of manufacturing facilities having a plurality of production factors and diagnose them at once.

BRIEF DESCRIPTION OF THE DRAWINGS

FIG. 1 is a schematic diagram schematically showing a method of quantifying and diagnosing the quality of a manufacturing facility according to an embodiment of the present invention.

FIG. 2 is a graph showing the results of obtaining continuous inspection values for a target product.

FIG. 3 is a graph showing the result of deriving a conversion peak per frequency indicating the degree of expression per production cycle by separating inspection values continuously obtained for each frequency band.

FIG. 4 is a graph showing a result of comparing the natural frequency of each production factor and the conversion peak per frequency.

DETAILED DESCRIPTION OF THE PREFERRED EMBODIMENTS

Hereinafter, the present invention will be described in detail with reference to the drawings. The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention.

The present invention relates to a method of diagnosing the quality of a manufacturing facility, and the method includes:

a step of obtaining continuous inspection values for a target product;

a step of deriving a conversion peak per frequency indicating a degree of expression per production cycle by separating the continuously obtained inspection values for each frequency band;

a step of securing the natural frequency for each production factor expressed per production cycle for each production factor; and a step of diagnosing the quality of each production factor by comparing the natural frequency of each production factor and the conversion peak per frequency.

In each of the above steps, the step of securing the natural frequency expressed per production cycle for each production factor can be performed separately, regardless of before or after performing other steps. For example, in the step of securing a natural frequency expressed per production cycle for each production factor, the natural frequency expressed per production cycle for each production factor may be secured in advance before performing the diagnostic method according to the present invention.

In one example, in the method for diagnosing a quality of a manufacturing facility according to the present invention, the step of obtaining the continuous inspection values for the target product includes inspecting a specific factor of the target product and continuously acquiring the inspection values by comparing inspection results based on a reference value. In the present invention, an inspection value is continuously acquired for a target product. This means that the quality inspection of the target product is continuously performed at the middle or end of the production line. For example, the shape, size, or physical properties of the target product are continuously inspected, and this is constructed as data. In the present invention, the continuous acquisition of the inspection value includes performing a complete inspection on a target product or performing a sample test at regular intervals, but means that the process is performed at regular intervals.

Specifically, in the step of acquiring continuous inspection values for the target product, a specific element of the target product is inspected. If the inspection result exceeds the reference value, it is quantified as a positive (+) number, and if the inspection result is less than the reference value, it is quantified as a negative (−) number, and the quantified values are continuously acquired and performed. The method of obtaining the inspection value for the target product is not particularly limited as long as the result can be obtained as a quantified graph. As an example, an inspection value is obtained for a specific factor of a target product, for example, a thickness or a property value of a specific area. In this case, a reference value that can be identified as a normal product is set in advance, and a (+) or (−) sign is added to the delta value of the reference value and the inspection value of the target product for quantification.

In the step of acquiring continuous inspection values for the target product, the target product is an electrochemical device. In the present invention, the electrochemical device includes not only a unit cell such as a battery or a capacitor, but also a battery module or a battery pack. Specifically, the electrochemical device is a secondary battery, for example, a lithium secondary battery. In one example, a manufacturing facility subject to the present invention is a facility for manufacturing a secondary battery unit cell or a secondary battery module. At this time, the inspection values for the target product include, for example, battery size specifications, low or high temperature stability, charge/discharge capacity or charge/discharge cycle characteristics.

In one example, the step of deriving the conversion peak per frequency indicating the degree of expression per production cycle by separating the continuously obtained inspection values for each frequency band is performed by Fast Fourier Transform (FFT). In the present invention, as long as separation from a graph representing continuously acquired inspection values is possible, the conversion technique can be applied in various ways. As an example, Fast Fourier Transform (FFT) is an algorithm that computes the Discrete Fourier Transform (DFT) or the inverse (IDFT) of a sequence. Fourier analysis transforms a signal from its original domain (often time or space) to a representation of the frequency domain, and vice versa. The Discrete Fourier Transform (DFT) is obtained by decomposing a series of values into components of different frequencies.

A schematic description of the fast Fourier transform is as follows. However, the following description is only for a general understanding of the fast Fourier transform, and the present invention is not limited thereto. In addition, the fast Fourier transform can be explained through various papers, and the present invention includes all of them.

Fast Fourier Transform is an algorithm that calculates an approximate value of a function, and is designed to reduce the number of operations when calculating a Discrete Fourier Transform using an approximation formula based on the Fourier transform.

The fast Fourier transform became commonly known by J. W. Coli and J. W. Turkey in the mid-1960s, and has been independently discovered and used by several people for about 20 years before that.

For example, when $h^m (0 \leq m \leq N-1)$ is a set of complex numbers, the discrete Fourier transform of the sequence $\{h^m\}$ is as follows.

$$H_n = \frac{1}{N} \sum_{m=0}^{N-1} h_m \exp(-2\pi i m n / N) \qquad \text{[Formula 1]}$$

$$(0 \leq n \leq N-1)$$

In the same way as in the continuous Fourier transform, the inverse transform can be obtained for the discrete transform as follows.

$$h_n = \sum_{m=0}^{N-1} H_m \exp(-2\pi i m n / N) \qquad \text{[Formula 2]}$$

$$(0 \leq n \leq N-1)$$

h″ is called the inverse Fourier transform coefficient. The algorithm of Fast Fourier Transform is based on the fact that the calculation of Formula 1 can be performed by dividing the steps using direct product decomposition.

When $N=N^1 N^2$ and $N^1$ and $N^2$ are relative prime, a two-dimensional Fourier transform coefficient is taken as an example as follows.

$$H_{n_1, n_2} = [1/N_1 N_2] \times \sum_{m_1=0}^{N_1-1} \sum_{m_2=0}^{N_2-1} \exp(-2\pi i (n_1 m_1 / N_1 + n_2 m_2 / N_2)) h_{m_1, m_2}$$

If one complex multiplication and complex addition are used as one basic operation, when using Horner's method, $N^2$, that is, the operation of $(N_1 N_2)^2$ is required, but when using the direct product decomposition method, $H_{n_1, n_2}$ can be calculated by the operation of $N_1 N_2 (N_1 + N_2)$. Since the matrix corresponding to the above transformation is a direct product of the NAN¹ and $N_2 \times N_2$ matrices, the calculation is performed by dividing it into the following two steps.

As a first step, for $0 \leq m1 \leq N1-1$ and $0 \leq n2 \leq N2-1$, $$\xi_{m1, n2} = \frac{1}{N_2} \sum_{m_2=0}^{N_2-1} h_m \exp(-2\pi i n_2 m_2 / N_2) h_{m1, m2} \qquad \text{[Formula 3]}$$

is calculated, and
Then, for $0 \leq n1 \leq N1-1$ and $0 \leq n2 \leq N2-1$, $$H_{n1, n2} = \frac{1}{N_1} \sum_{m_1=0}^{N_1-1} \exp(-2\pi i n_1 m_1 / N_1) \xi_{m_1, n_2} \qquad \text{[Formula 4]}$$

is calculated.

In one example, the step of securing the natural frequency for each production factor expressed per production cycle for each production factor includes deriving production factors that affect production of the target product, and securing a natural frequency based on the number of expressions per production cycle for each derived production factor. Specifically, the number of expressions per production cycle for each production factor is a result of extracting a frequency at which an inspection value for a specific factor of the target product deviates from a standard value due to an influence of each production factor. Further, the production factor is an equipment factor involved in the production of the target product. For example, the equipment factor is an electrochemical device manufacturing equipment factor. In a facility for manufacturing a unit cell of a lithium secondary battery, for example, a raw material supply unit, various rollers, conveying belts, etc. are respective production factors, and these influence the production of the target product. Some of these production factors cause defects in certain parts of the product with frequent and short cycles, within a given repetition period. Another factor of production causes defects in certain parts of the product with relatively few times and long cycles. In the step of securing the natural frequency according to the present invention, the natural frequency expressed per production cycle for each of various production factors including the above-described production factors is secured.

In one example, the step of diagnosing the quality of each production factor by comparing the natural frequency of each production factor and the conversion peak per frequency includes selecting a production factor of a natural frequency corresponding to a frequency at which the conversion peak is high is selected as a subject of quality improvement by comparing each conversion peak per frequency for each natural frequency for each pre-set production factor. In another example, by comparing each conversion peak per frequency for each natural frequency for each pre-set production factor, a production factor of a natural frequency corresponding to a frequency at which a conversion peak is higher than a specific value is selected as a subject of quality improvement, and a production factor of a natural frequency corresponding to a frequency at which the conversion peak is lower than a specific value is excluded from the subject of quality improvement. Further, in the present invention, after the step of diagnosing the quality of each production factor by comparing the natural frequency of each production factor and the conversion peak per frequency, the method further includes a step of supplementing or replacing production factors selected as subjects of quality improvement.

Hereinafter, the present invention will be described in more detail through drawings and the like, but this is only a specific example of the present invention, and the scope of the present invention is not limited thereto.

FIG. 1 is a schematic diagram schematically showing a manufacturing facility quality quantification diagnostic method according to the present invention. FIG. 2 is a graph showing the results of obtaining continuous inspection values for a target product. FIG. 3 is a graph showing the result of deriving a conversion peak per frequency indicating the degree of expression per production cycle by separating inspection values continuously obtained for each frequency band. In addition, FIG. 4 is a graph showing a result of comparing the natural frequency of each production factor and the conversion peak per frequency.

In FIG. 1, a product inspection is first performed. The product inspection is a process of obtaining continuous product inspection values for a target product. For example, when manufacturing a unit cell of a secondary battery, a specific factor of a target product is inspected, and an inspection value is continuously obtained by comparing the inspection result value with the reference value. Here, the specific factor of the target product may be selected from product quality evaluation items, and any one factor or a plurality of factors may be considered in combination. Referring to FIG. 2, a specific factor of a target product is continuously inspected and a product inspection value derived therefrom is shown.

Then, frequency analysis is performed on the obtained product inspection results. In this case, successively obtained inspection values are separated for each frequency band by using a fast Fourier transform or the like, and a conversion peak per frequency representing the degree of expression per production cycle is derived therefrom. Referring to FIG. 1, the test values derived in the product inspection process are separated for each frequency band (see waves 1 to 3). Then, a conversion peak per frequency representing the degree of expression per production cycle is derived from the graph separated by frequency band. FIG. 3 is a result of deriving a conversion peak per frequency indicating the degree of expression per production cycle after separating the product inspection values derived in FIG. 2 for each frequency band through a fast Fourier transform.

Next, it goes through a process of matching with the natural frequency of each unit. This is a step of diagnosing the quality of each production factor by comparing the natural frequency of each production factor and the conversion peak per frequency. In this case, the production factor of the natural frequency corresponding to the frequency in which the conversion peak appears high is selected as a quality improvement target, compared to the conversion peak per frequency for each natural frequency of each production element.

Referring to FIG. 4, the result of comparing the natural frequency per production factor and the conversion peak per frequency can be confirmed. In a production facility that manufactures a unit cell of a secondary battery, the natural frequencies of respective production factors expressed per production cycle for each production factor were secured in advance. Herein, examples of the production factors include feeder unit, negative electrode idle roller, negative electrode feeding C/V belt, positive electrode feeding C/V belt, merge C/V belt, and align C/V belt. And, it is compared with the conversion peak per frequency, which represents the degree of expression per production cycle.

Referring to the results of FIG. 4, in the case of the positive electrode feeding C/V belt (cathode feeding C/V belt), the natural frequency expressed per production cycle was about 7.91, and the degree of expression was the highest. On the contrary, in the case of the feeder unit, it was confirmed that the natural frequency expressed per production cycle was about 2, and the degree of expression was very low. Therefore, in the facility of FIG. 4, the positive electrode supply C/V belt is a subject of priority supplement, and the raw material supply unit is a subject of subsequent supplement. Follow-up measures are taken to supplement or replace production factors selected for quality improvement.

The invention claimed is:

1. A method for diagnosing a quality of a manufacturing facility, comprising:
   continuously obtaining inspection values for a target product;
   deriving a conversion peak per frequency indicating a degree of expression per production cycle by separating the inspection values for each frequency band;
   securing a natural frequency for each production factor of the target product expressed per production cycle for each production factor; and
   diagnosing a quality of each production factor by comparing the natural frequency of each production factor and a conversion peak per frequency corresponding to the natural frequency,
   wherein the securing the natural frequency for each production factor expressed per production cycle for each production factor includes deriving each production factor that affects a production of the target product, and securing the natural frequency based on a number of expressions per production cycle for each production factor, and
   the number of expressions per production cycle for each production factor is a result of extracting a frequency at which an inspection value for a specific factor of the target product deviates from a standard value due to an influence of each production factor.

2. The method of claim 1, wherein the continuously obtaining the inspection values for the target product includes inspecting the specific factor of the target product and continuously acquiring the inspection values by comparing inspection results based on a reference value.

3. The method of claim 1, wherein the continuously obtaining the inspection values for the target product includes inspecting the specific factor of the target product, wherein if an inspection result exceeds a reference value, the specific factor is quantified as a positive number, and wherein if the inspection result is less than the reference value, the specific factor is quantified as a negative number, and the continuously obtaining the inspection values for the target product continually obtains quantified numbers.

4. The method of claim 1, wherein in the continuously obtaining the inspection values for the target product, the target product is an electrochemical device.

5. The method of claim 1, wherein the deriving the conversion peak per frequency indicating the degree of expression per production cycle by separating the continuously obtained inspection values for each frequency band is performed by Fast Fourier Transform (FFT).

6. The method of claim 1, wherein each production factor is an equipment factor that is involved in the production of the target product.

7. The method of claim 6, wherein the equipment factor is an electrochemical device manufacturing equipment factor.

8. The method of claim 1, wherein the diagnosing the quality of each production factor includes selecting a production factor of a natural frequency corresponding to a frequency at which a respective conversion peak is high as a subject of quality improvement by comparing each conversion peak per frequency for each natural frequency for each production factor.

9. The method of claim 1, wherein, by comparing each conversion peak per frequency for each natural frequency for each production factor, a production factor of a natural frequency corresponding to a frequency at which a respective conversion peak is higher than a specific value is selected as a subject of quality improvement, and a production factor of a natural frequency corresponding to a frequency at which a respective conversion peak is lower than the specific value is excluded from the subject of quality improvement.

10. The method of claim 1, after the diagnosing the quality of each production factor by comparing the natural frequency of each production factor and the conversion peak per frequency corresponding to the natural frequency, further comprising: supplementing or replacing production factors selected as subjects of quality improvement.

\* \* \* \* \*